(12) United States Patent  
Sullivan et al.

(10) Patent No.: US 7,886,020 B2
(45) Date of Patent: Feb. 8, 2011

(54) COMPUTER PERIPHERAL DEVICE FOR ACCESSING WEB SITE CONTENT

(75) Inventors: Michael P. Sullivan, East Aurora, NY (US); Anthony R. Favorito, Buffalo, NY (US); David J. Ciganko, Orchard Park, NY (US)

(73) Assignee: Mattel, Inc., El Segundo, CA (US)

( * ) Notice: Subject to any disclaimer, the term of this patent is extended or adjusted under 35 U.S.C. 154(b) by 427 days.

(21) Appl. No.: 11/872,109

(22) Filed: Oct. 15, 2007

(65) Prior Publication Data

US 2009/0100144 A1    Apr. 16, 2009

(51) Int. Cl.
G06F 15/16 (2006.01)
G06F 15/173 (2006.01)

(52) U.S. Cl. ...................... 709/217; 709/223

(58) Field of Classification Search .................. 709/217
See application file for complete search history.

(56) References Cited

U.S. PATENT DOCUMENTS

| | | | |
|---|---|---|---|
| 4,540,176 A | 9/1985 | Baer | |
| 4,820,233 A | 4/1989 | Weiner | |
| 5,451,178 A | 9/1995 | Yorozu et al. | |
| 5,855,483 A * | 1/1999 | Collins et al. | 434/322 |
| 6,025,830 A | 2/2000 | Cohen | |
| 6,171,168 B1 | 1/2001 | Jessop | |
| 6,443,796 B1 * | 9/2002 | Shackelford | 446/91 |
| 6,460,851 B1 | 10/2002 | Lee et al. | |
| 6,524,159 B1 | 2/2003 | Kawarizadeh | |
| 6,650,870 B2 | 11/2003 | White et al. | |
| 6,800,013 B2 | 10/2004 | Liu | |
| 6,952,196 B2 | 10/2005 | Weil et al. | |
| 6,988,896 B2 | 1/2006 | Cho | |
| 7,037,166 B2 | 5/2006 | Shrock et al. | |
| 7,081,033 B1 | 7/2006 | Mawle et al. | |
| 7,151,527 B2 * | 12/2006 | Culver | 345/157 |
| 2002/0061701 A1 | 5/2002 | Chan | |
| 2003/0001016 A1 * | 1/2003 | Fraier et al. | 235/462.03 |
| 2003/0115264 A1 | 6/2003 | Takiyama | |
| 2004/0106457 A1 | 6/2004 | Shinoda | |

(Continued)

OTHER PUBLICATIONS

International Search Report for PCT/US08/79914, dated Dec. 8, 2008.

*Primary Examiner*—Aaron Strange
*Assistant Examiner*—James Edwards
(74) *Attorney, Agent, or Firm*—Edell, Shapiro & Finnan, LLC

(57) ABSTRACT

A computer peripheral device is provided comprising a housing, a plurality of figures each having a unique physical appearance and a unique structural characteristic, an identifying portion that is configured to identify one of the plurality of figures, at a time, based on the unique structural characteristic of the figure. The computer peripheral device comprises a controller coupled to the identifying portion that generates an identifier associating with the figure identified by the identifying portion. Connection of the computer peripheral device to a computer is made by a standard connection cable, such as a USB cable. Computer software is installed in the computer to store data associating a web site address with an identifier for each of the plurality of figures. A web browser application is activated to retrieve content from a web site having a web site address corresponding to an identifier received from the controller in the computer peripheral device.

18 Claims, 15 Drawing Sheets

U.S. PATENT DOCUMENTS

2004/0139182 A1* 7/2004 Chang et al. ................ 709/223
2006/0079150 A1* 4/2006 Filoseta et al. .............. 446/431
2006/0093995 A1 5/2006 Brown et al.
2009/0064302 A1* 3/2009 Colella .......................... 726/9

* cited by examiner

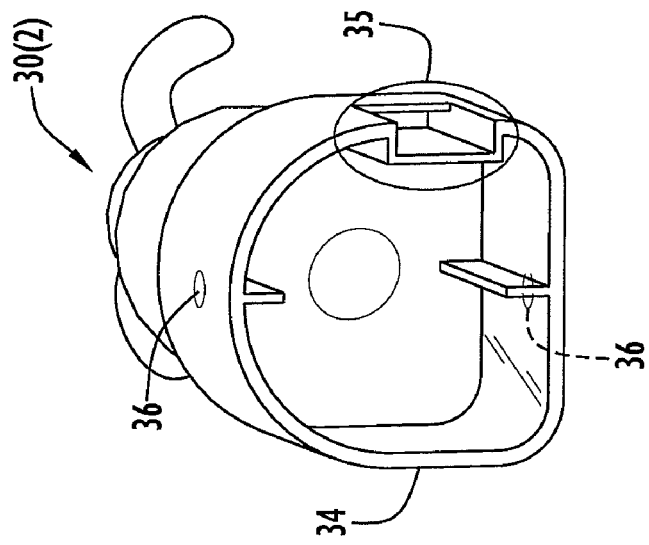
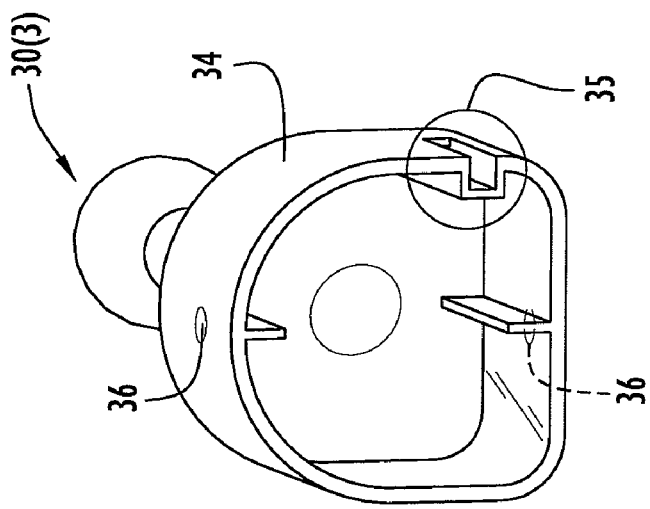
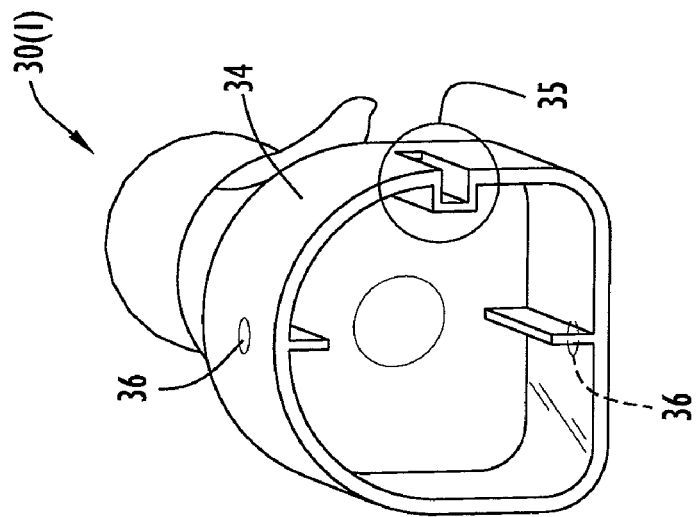

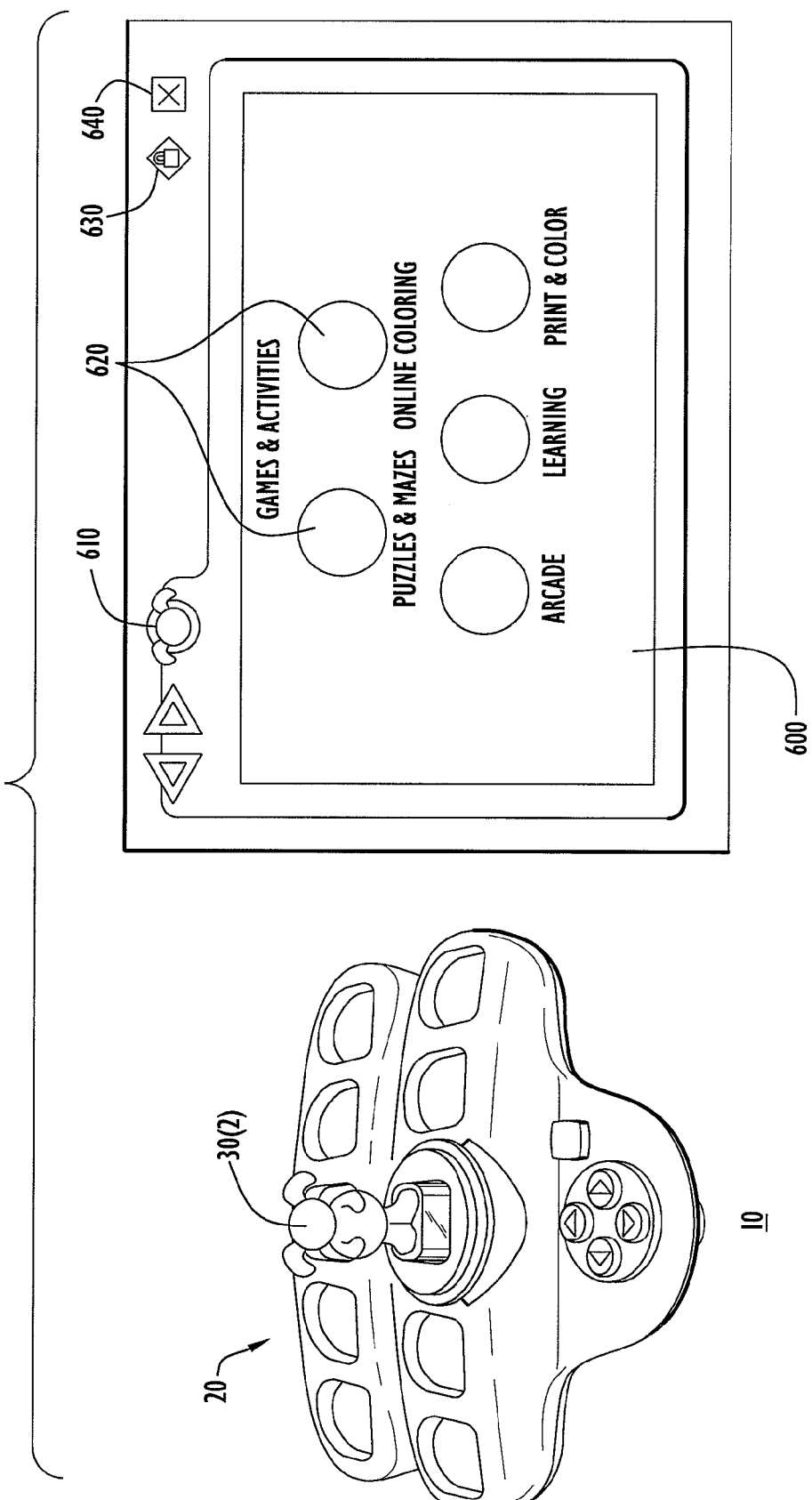

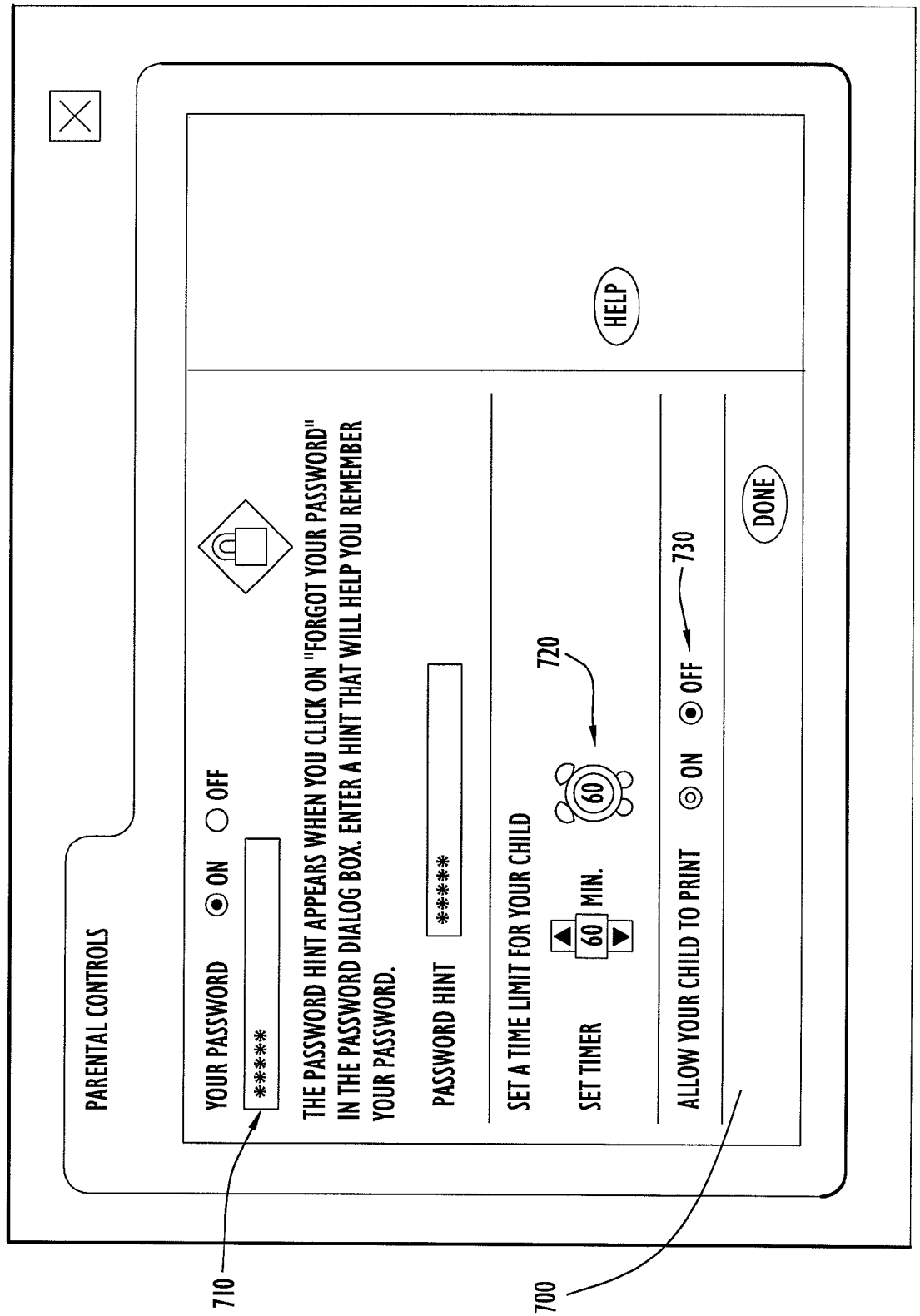

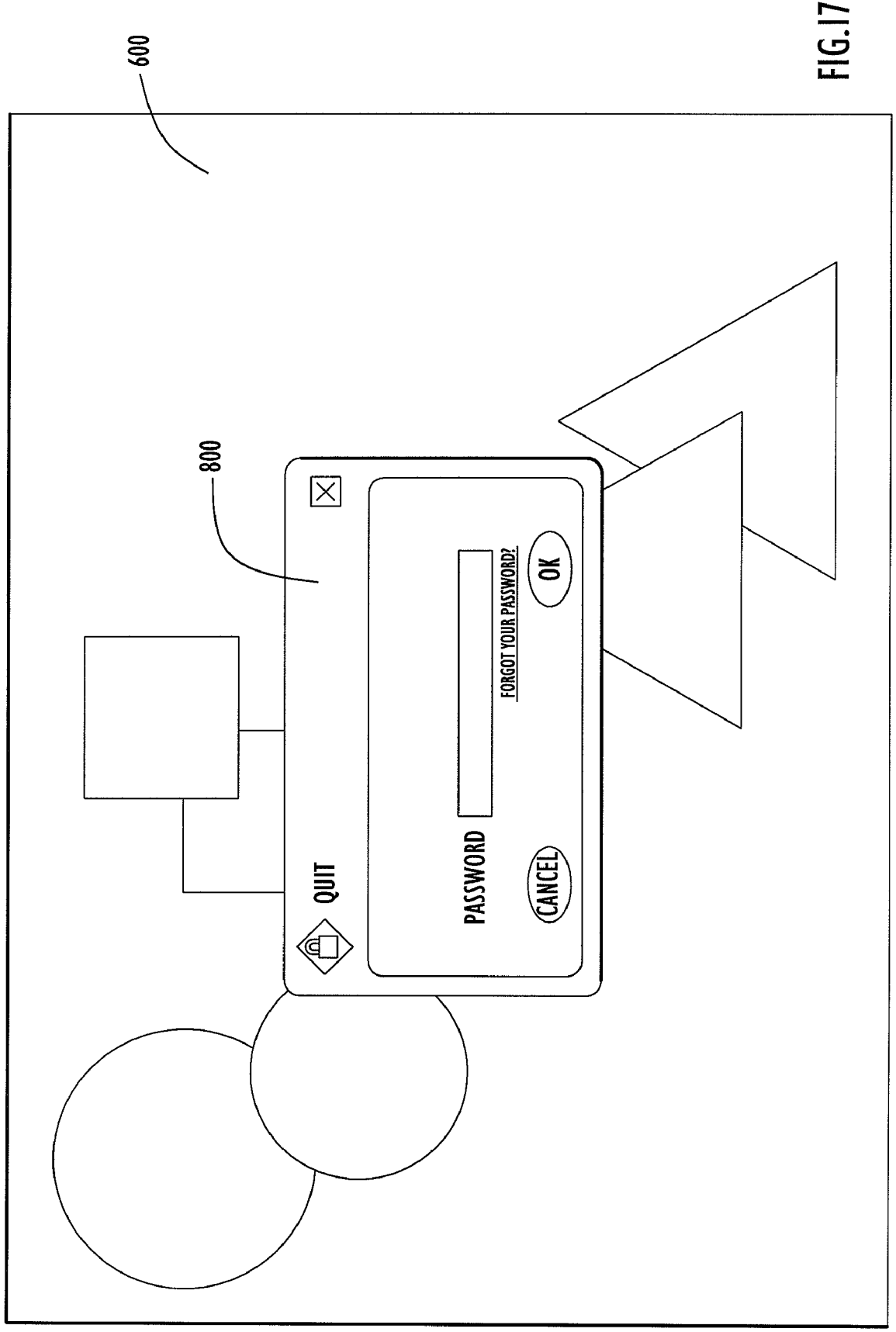

COMPUTER PERIPHERAL DEVICE FOR ACCESSING WEB SITE CONTENT

BACKGROUND OF THE INVENTION

The present invention relates to a device that enables a child to access content over the Internet in a child-friendly and content-safe manner.

Parents of young children are interested in providing access for their children to games, songs, and other child appropriate content available on various web sites on the Internet. One way to do this is for the parent to sit down at a computer with a child and use a computer keyboard to search and/or type in the web address for appropriate child friendly web sites. For some parents, this is undesirable because it requires that the parent constantly monitor the child's use of the computer to be sure the child does not intentionally or inadvertently browse a web site with content inappropriate for children.

Thus, what is needed is a device that a child can use to access web sites that provide child-friendly content without allowing the child to freely use a web browser on a computer to access inappropriate web site content.

SUMMARY OF THE INVENTION

Briefly, a computer peripheral device is provided that connects to a computer and operates in connection with driver software installed on the computer. The device comprises a housing and a plurality of figures. There is a receptacle on the housing that receives one of the figures at a time. The figures that are not in use may be kept in storage positions or receptacles on the housing. The receptacle serves as an identifying portion of the device and is configured to identify which of the figures a user has selected and placed in it. A controller in the device generates a message that includes an identifier of the figure placed in the receptacle. This message is sent to the computer where the driver software retrieves from stored data a web site address associated with the identified toy figure. The web site address for a toy figure is for a web site that provides child-appropriate content that is topically (thematically) related to a physical or ornamental appearance or likeness of the figure that is placed in the receptacle. The figures may be toy figures that have a shape or character form or likeness that is well known or otherwise readily identifiable to children in certain age groups. Alternatively, the figures may have a color pattern or other indicia that is useful for certain educational applications for older children.

In one embodiment, there is a matrix of switch levers positioned in the receptacle. Each switch lever is associated with, and actuated (closed or opened) by a corresponding electrical switch. One or more of the switch levers are selectively engaged by the figure inserted in the receptacle for purposes of identifying which figure has been inserted. To this end, the figure has a base portion that has a structural characteristic (e.g., geometric profile) configured to engage a unique set of one or more of the switch levers. Thus, the states of the electrical switches are used to identify the specific figure placed on the receptacle.

The driver software installed on the computer includes a web browser application that retrieves content from a web site corresponding to one of the stored web site addresses. This web browser is separate from any web browser application that may already be installed on the computer. In one embodiment, the driver software includes a password protection utility that requires entry of a password, such as by an adult, in order to disable the driver software application on the computer and thus allow access to other software and functions on the computer.

BRIEF DESCRIPTION OF THE DRAWINGS

FIG. 6 is a bottom view illustrating a base portion of the toy figure shown in FIG. 5.

FIG. 7 is a bottom view illustrating a base portion of another toy figure used in connection with the computer peripheral toy device according to the present invention.

FIG. 8 is a bottom view illustrating a base portion of yet another toy figure used in connection with the computer peripheral toy device according to the present invention.

FIG. 15 is a diagram showing an example of the computer peripheral toy device used to retrieve web site content that is topically related to the physical appearance of a toy figure placed in the identifying portion of the computer peripheral toy device according to an embodiment of the present invention.

FIG. 16 is a screen shot of a user interface display screen used to set parental controls for use of the computer peripheral toy device.

FIG. 17 is a screen shot of user interface display screen used for password-protected deactivation of the driver software on the computer device to which the computer peripheral toy device is connected.

DETAILED DESCRIPTION

The present invention is directed to a plug-and-play computer peripheral device that allows a child to access a web site that contains child-friendly content. The device allows the child to only access a predetermined set of web sites. The device comprises a housing and a plurality of toy figures each of which has any unique ornamental physical appearance or character likeness that is familiar or readily identifiable to children of a certain age group. A cable connects the housing to a standard port on a personal computer. Software is installed on the personal computer (PC) that interfaces with the device. A child selects one of the toy figures and inserts it into an activation receptacle in the housing. Switches in the activation receptacle identify which one of the toy figures is inserted. The software in the computer communicates with the device and receives a message indicating which of the toy figures is inserted to retrieve an identifier of a web site associated with the toy figure to thereby open a child-friendly website associated with the toy figure.

Figure 1:
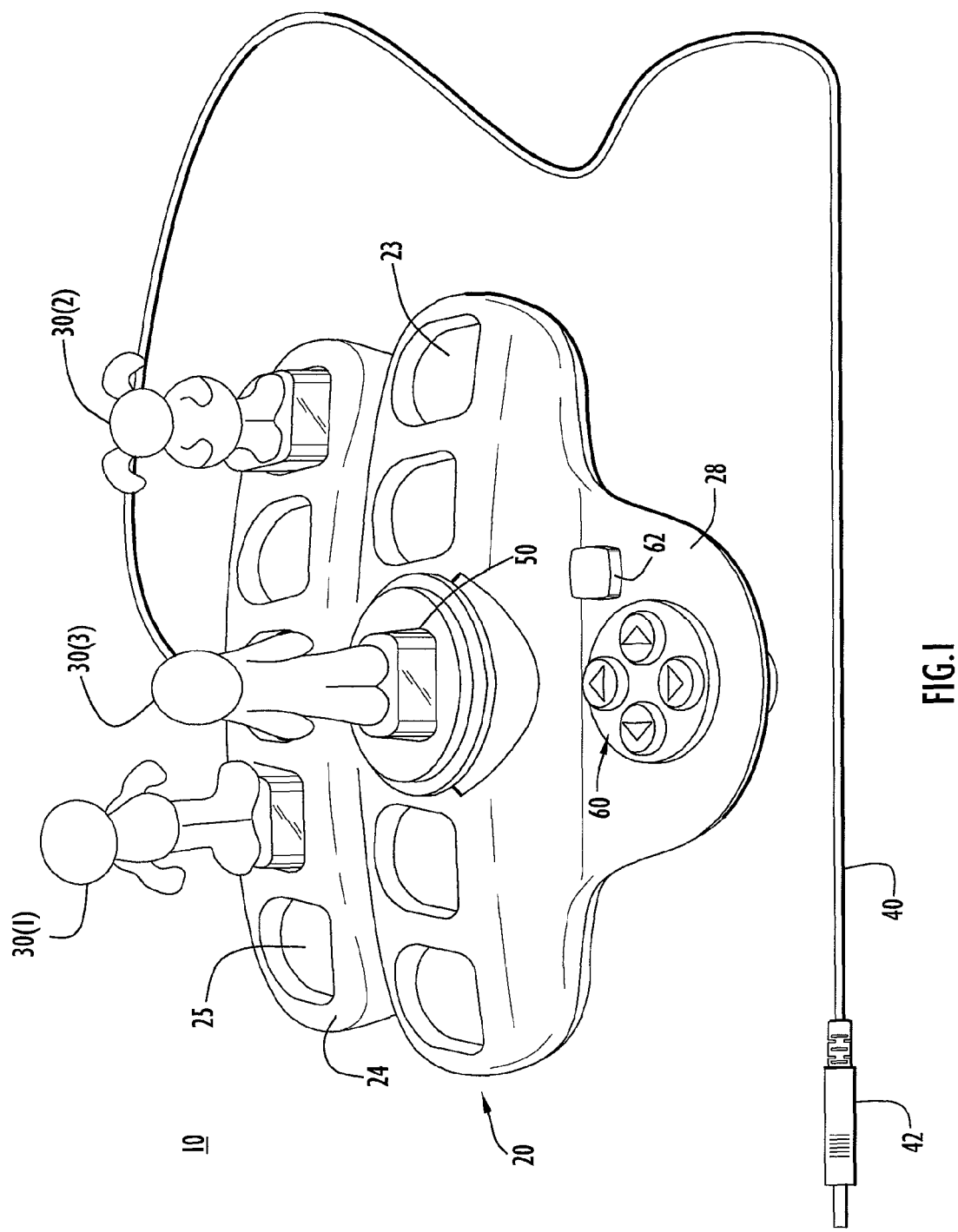
FIG. 1 is a perspective view of a computer peripheral toy device according to an embodiment of the present invention.
Figure 2:
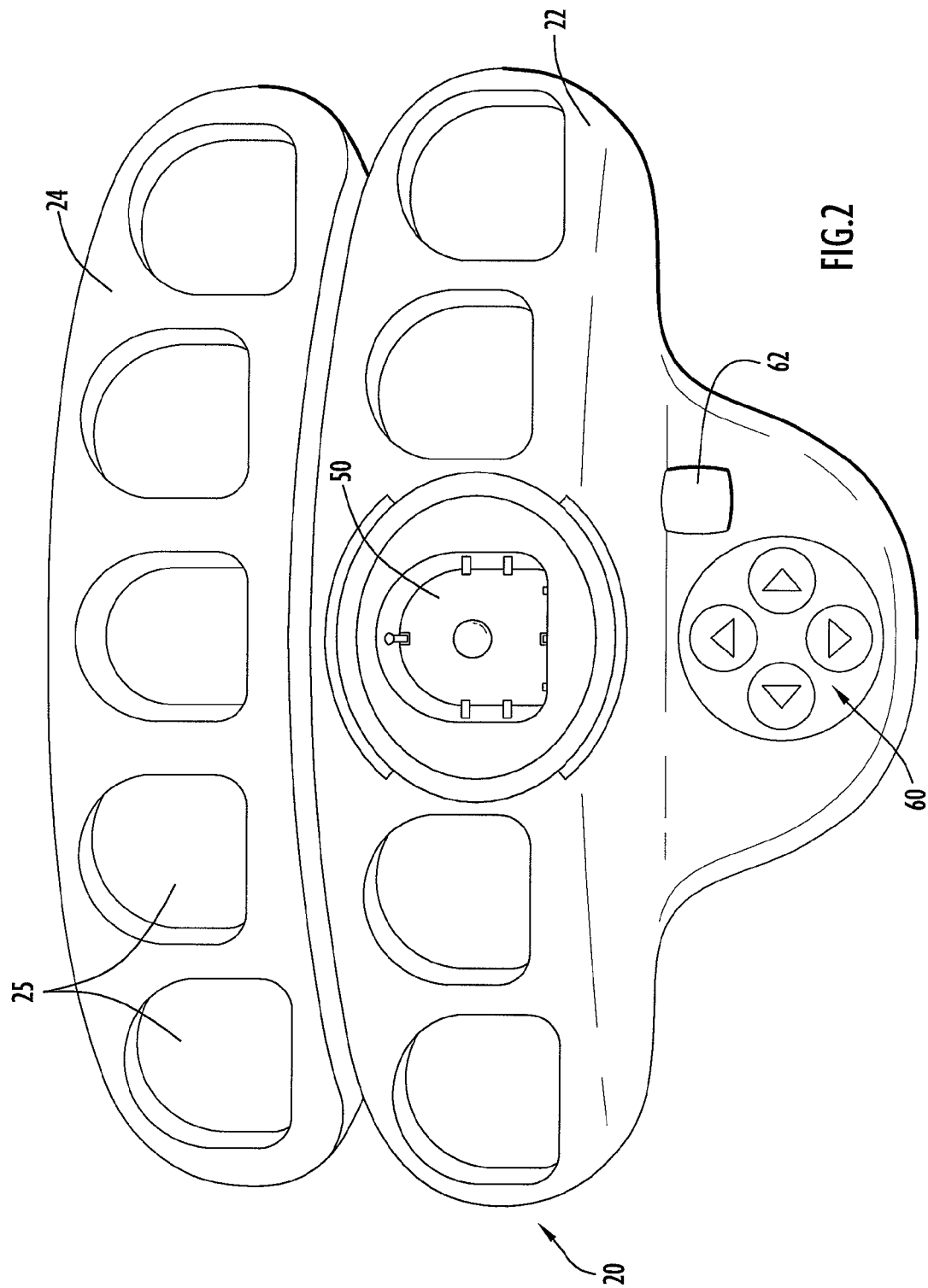
FIG. 2 is a top view of the computer peripheral toy device according to the present invention.

Referring first to FIGS. 1 and 2, the computer peripheral device is generally shown at reference numeral 10. The device 10 comprises a housing 20 and a plurality of toy FIGS. 30(1), 30(2) and 30(3), but it should be understood there may be more or less toy figures. The term "toy figures" is referred to collectively herein with respect to reference numeral 30, but a particular toy figure is referred to with an index, e.g., 30(1), 30(2), etc. The housing 20 has a main portion 22 that comprises storage receptacles 23 for toy FIG. 30, and a secondary portion 24 that also comprises storage receptacles 25 for toy FIG. 30. A connection cable 40 is provided that attaches to a back of the housing 20 and has a connection plug 42 that connects to a PC. For example, the connection cable 40 is a Universal Serial Bus (USB) cable and the plug 40 fits into a standard USB port on a PC.

In a middle area of the main body portion 22, there is a single activation receptacle 50 into which any one of the toy FIG. 30 may be inserted. The activation receptacle 50 is described in more detail hereinafter in conjunction with FIG. 4, but generally it is positioned on the housing 20 and is configured to receive one (at a time) of the plurality of toy FIG. 30. Thus, the activation receptacle 50 serves as an identifying portion of the device 10 to assist in identifying which of the plurality of toy figures it receives. The main portion 22 of the housing 20 further includes a lower shelf 28 on which a plurality of navigation buttons 60 are provided as well as a solitary "enter" button 62.

As shown from the top view of the device 10 in FIG. 2, there are, for example, a total of nine storage receptacles, four on the main portion 20 and five more on the secondary portion 24. The activation receptacle 50 may be positioned in a middle position on the main portion 22 such that there are an equal number of storage receptacles 23 on opposite sides of the activation receptacle 50. The activation receptacle 50 contains a switch matrix or network that is described in detail hereinafter.

Figure 3:
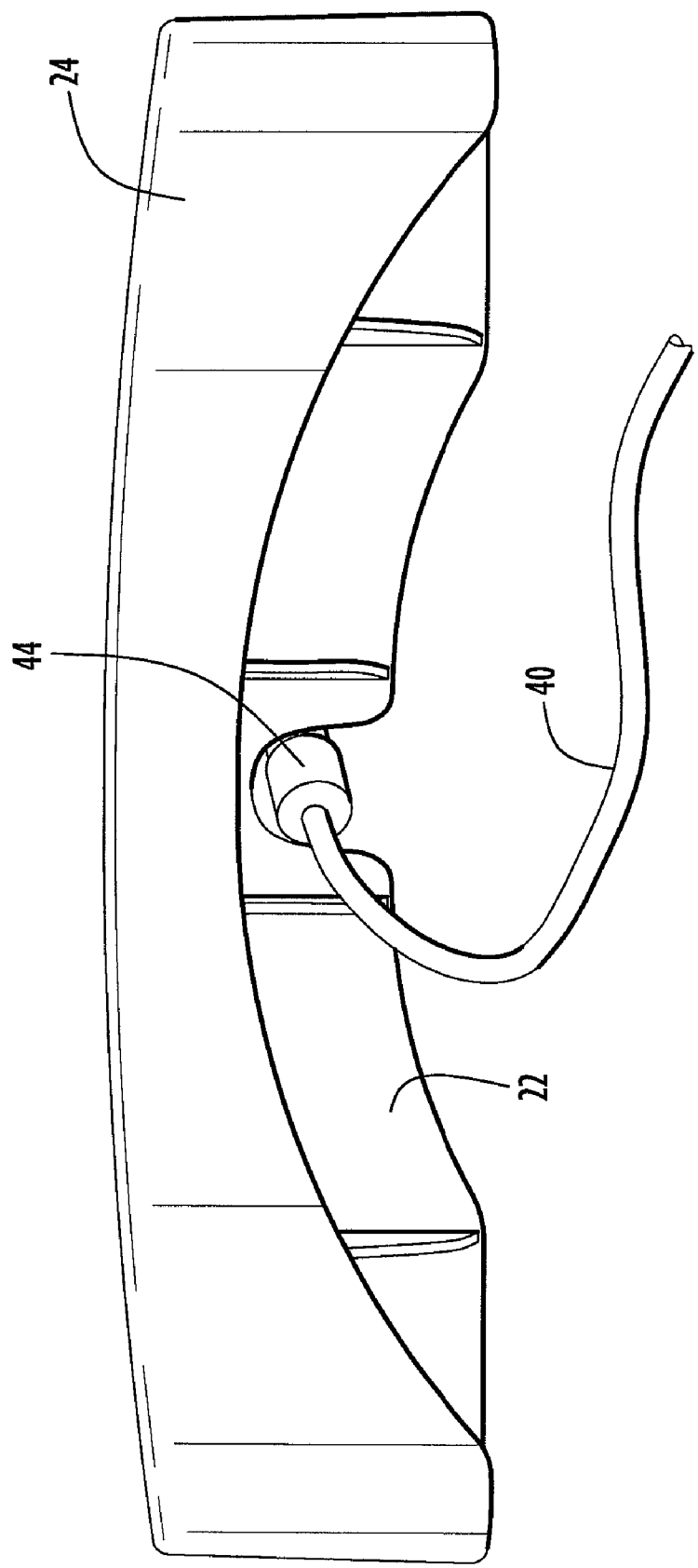
FIG. 3 is a rear view of the computer peripheral toy device according to the present invention.

Turning to FIG. 3, the back of the device 10 is shown. The connection cable 40 connects to the electronic components inside the main housing portion 22 at a location 44 beneath where the secondary housing portion 24 attaches to the main housing portion 22.

Figure 4:
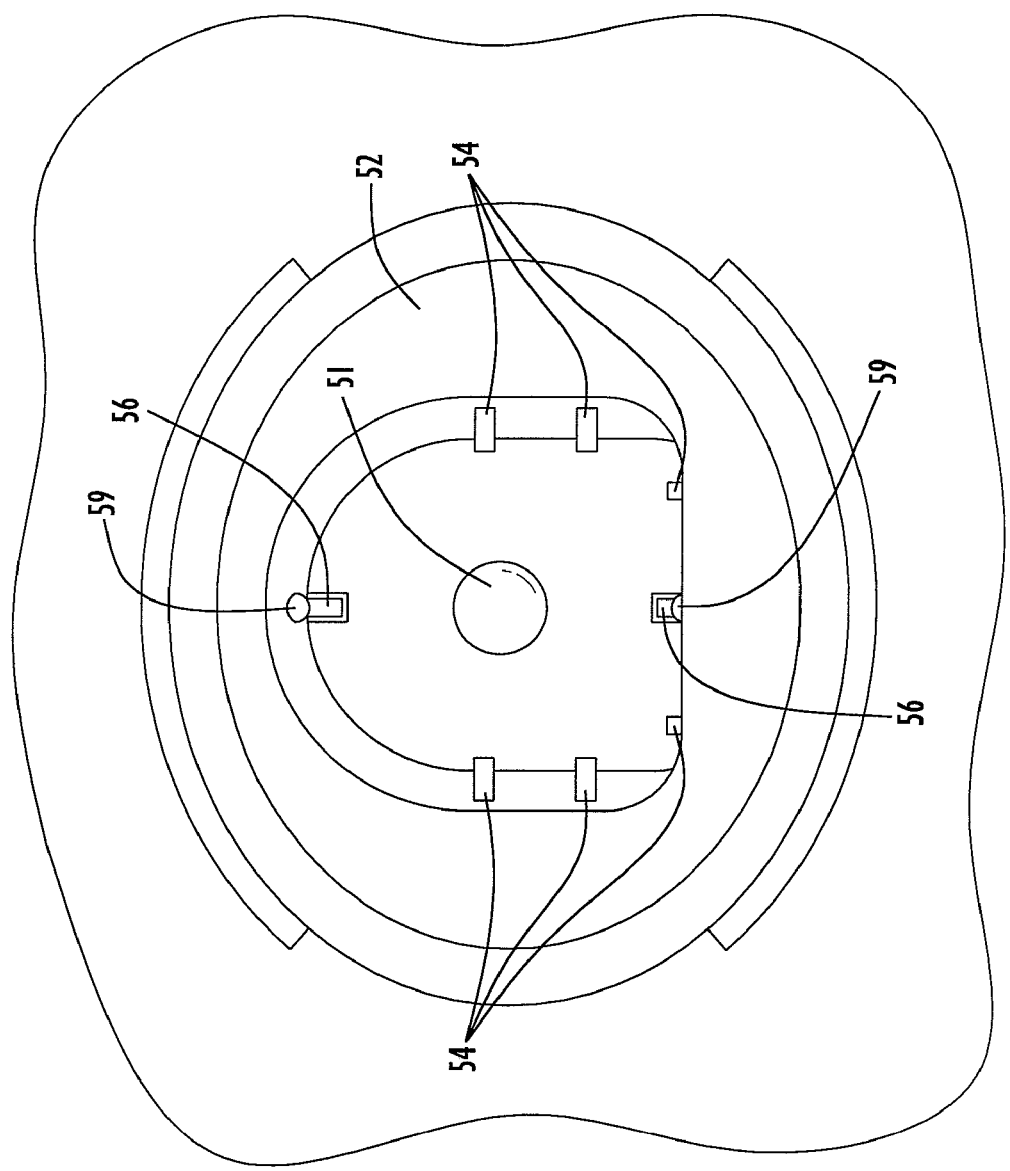
FIG. 4 is a top close-up view of an identifying portion of the computer peripheral toy device according to an embodiment of the present invention.

Reference is now made to FIG. 4 which illustrates the activation receptacle 50 in greater detail. The activation receptacle is defined within a receptacle housing 52 that sits within a correspondingly shaped space in the main housing portion 22. The profile of the main receptacle 50 is U-shaped (actually, upside down U-shaped). There is a plurality of switch levers 54 that extend through the side walls of the receptacle 50 so that they all are in the path of an object (i.e., the base of one of the toy FIG. 30) that fits snugly inside the receptacle 50. For example, there are two switch levers 54 on each of the three straight side walls of the switch receptacle. In addition, there are two dock switch levers 56 that extend upwards through a bottom wall of the receptacle 50. The switch levers 54 are pushed inward under pressure from a surface on the base of one of the toy FIG. 30. Similarly, the dock switch levers 56 are pushed inward under pressure from a surface on the base of one of the toy FIG. 30. Inside the housing there is a switch that is associated with each of the switch levers 54 and the dock switch levers 56. Thus, when one of the switch levers 54 and dock switch levers 56 is pushed inward, a corresponding electrical switch inside the housing 20 is actuated, e.g., closed (or opened).

Still referring to FIG. 4, there are two biased detents 59, each positioned on opposite walls of the receptacle 50 that are designed to fit within corresponding indents on the base of a toy FIG. 30 when the toy figure is properly inserted into the receptacle 50. In addition, there is a light bulb cover 51 in the center of the bottom wall of the receptacle. There is a light bulb element, such as a light emitting diode (LED) positioned beneath the cover 51 as is described in more detail hereinafter in connection with FIG. 9.

A unique one or more of the switch levers 54 are engaged when a corresponding toy FIG. 30 is inserted into the receptacle 50. Therefore, different ones of the switch levers are affected by different ones of the toy figures. Each of the switch levers 54 is operatively connected to a corresponding electrical switch to actuate (open or close) the associated electrical switch when engaged by the base of a toy figure. Both the dock switch levers 56 are engaged when a toy FIG. 30 is completely and properly inserted into the receptacle 50. Thus, based on the state of the positions (depressed or not depressed) of the switch levers 54 it can be determined which one of the toy figures is inserted into the receptacle 50.

Figure 5:
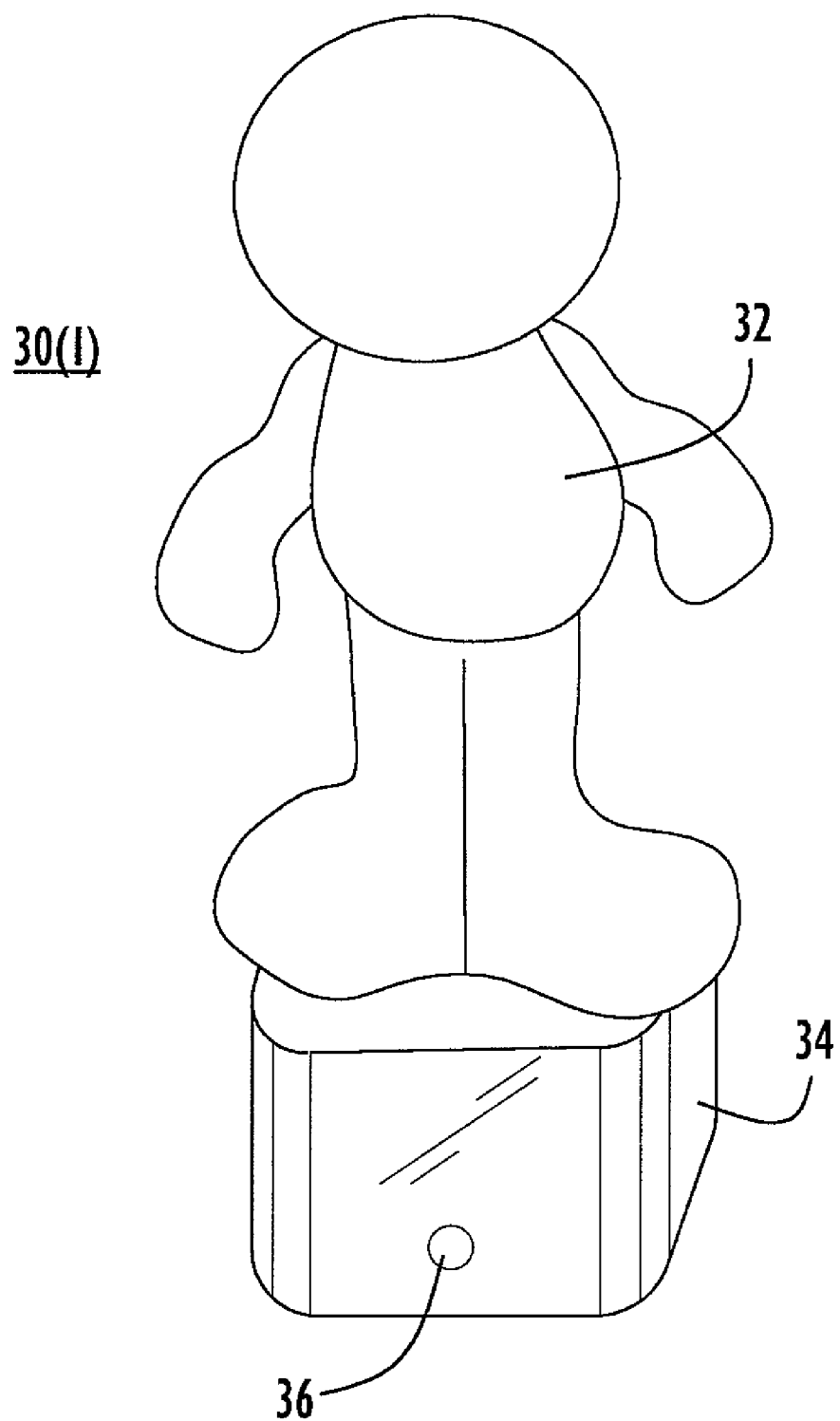
FIG. 5 is a front view of a toy figure used in connection with the computer peripheral toy device according to an embodiment of the present invention.

Turning to FIG. 5, one of the toy figures is described in more detail. FIG. 5 shows toy FIG. 30(1) as an example. Each toy figure comprises a unique stylized portion 32 that is mounted on a base 34. The base 34 is a hollow member that has a profile or shape that matches the shape of the receptacle 50 so that it can snugly fit into the receptacle 50. In addition, the base 34 may be made of a material 36 that transmits light, such as a transparent plastic. The stylized portion 32 may have a likeness or ornamental physical appearance of a character that is familiar to young children, such as characters from books, television shows, movies, cartoons, etc., that are commonly known to young children. However, the present invention is not limited to the use of figures that are in the shape of a character. For example, the figures may have other shapes of objects, such as flags, symbols, decals, indicia, color scheme or pattern, etc., that have a relationship with content on a web site. This may be useful in educational applications in which there are multiple fobs having different symbols or indicia, each associated with a type of educational activity served by corresponding web site content.

FIGS. 6-8 illustrate features of the toy FIG. 30 in further detail. The base 34 of each toy FIG. 30 has a unique structural characteristic that is used to identify the toy FIG. 30. FIG. 6 illustrates the features of the base 34 of toy FIG. 30(1), FIG. 7 illustrates the features of the base 34 of toy FIG. 30(3) and FIG. 7 illustrates the features of the base 34 of toy FIG. 30(2). As mentioned above, the base 34 of each toy figure has a slightly different external surface profile so that each toy figure engages a different and unique group (one or more) of the switch levers 54. In general, the base 34 of each of the toy figures is a polygonal wall comprising a U-shaped profile having a continuous smooth profile. However, on each base 34, there is a slot or notch 35 that breaks the otherwise continuous profile and extends from the bottom of the base 34 to nearly the top portion of the base 34 where the base attaches to the character. The location and/or size of the notch 35 on the base 34 is made to determine which of the switch levers 34 in the activation receptacle 50 (FIG. 4) is not contacted and pushed inward by the base 34 when the toy FIG. 30 is inserted in the activation receptacle 50. The size and/or location of the notch 35 is different on the base 34 of each toy FIG. 30 so that each toy figure engages a different and unique set (one or more) of the switch levers 54. For example, FIG. 6 shows the base of the toy FIG. 30(1), where the notch 35 is rather relatively narrow in width and is on the right side (as seen from the bottom of the base 34) a certain distance displaced from the flat sidewall of the base 34. FIG. 7 shows that the notch 35 on the base 34 of toy FIG. 30(3) is rather narrow in width and is on the right side of base 34 closely positioned to the flat sidewall of the base 34. FIG. 8 shows the notch 35 on the base 34 of toy FIG. 30(2). Unlike the notches on the toy FIGS. 30(1) and 30(3), the notch 35 on the base 34 of toy FIG. 30(2) is relatively wide, extending nearly the entire right sidewall from the flat sidewall to the curved sidewall of the base 34. Thus, whereas the notches on toy FIGS. 30(1) and 30(3) will prevent the base of these toy figures from engaging a single (albeit different) switch lever 54 in the activation receptacle 50, the notch on toy FIG. 30(2) will prevent the base of toy FIG. 30(2) from engaging two switch levers 54 in the activation receptacle 50.

Figure 9:
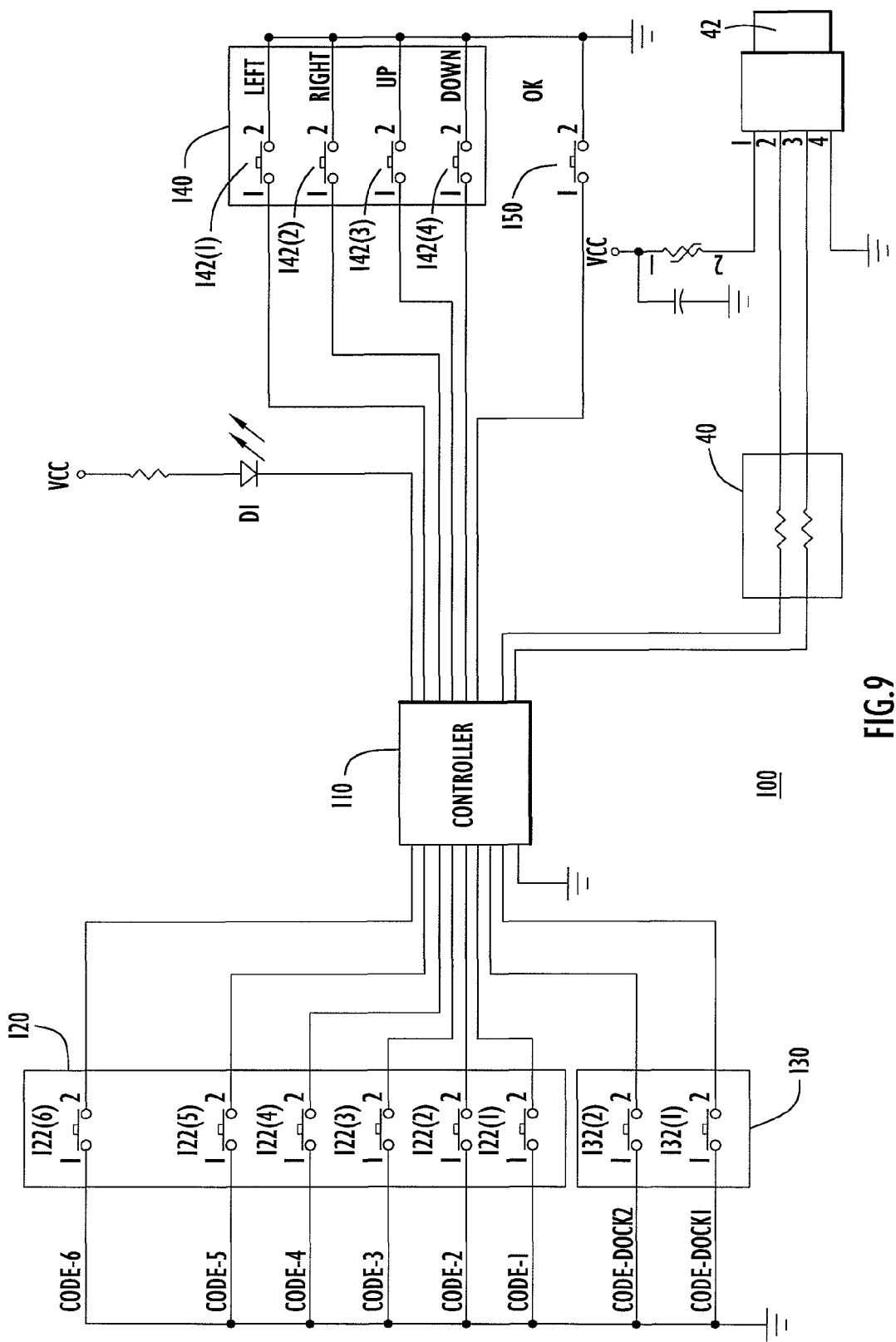
FIG. 9 is a schematic diagram of a control system of the computer peripheral toy device according to an embodiment of the present invention.

Turning now to FIG. 9, a control system 100 of the device 10 will be described. The controller system 100 is mounted on one more circuit boards inside the main housing portion 22 (FIG. 1). The control system 100 comprises a controller 110, a switch network 120, a switch network 130, a navigational keypad switch network 140, a solitary keypad switch 150 and a LED D1. The controller 110 may be a programmable microcontroller having integrated USB interface capability. For example, the controller 110 is an 8-bit flash-programmable microcontroller, such as is available from Cypress Semiconductor. However, other microcontrollers having similar functionality may also be used, and they need not incorporate on-board USB interface capability. The USB interface capability may be provided in a separate integrated circuit if so desired.

The switch network 120 comprises a plurality of push switches 122(1) to 122(6) connected to the controller 110. Each of the switches 122(1) to 122(6) is associated with a corresponding one of the switch levers 54 in the activation receptacle 50 (FIG. 4). A push switch 122(1) to 122(6) is pushed closed when a corresponding switch lever 54 is engaged by a surface of a base of a toy figure, but one or more of the switches 122(1) to 122(6) can be left in an open state when its associated switch lever is not pushed inward as a result of a notch on the base of a toy figure that is inserted into the activation receptacle 50. Thus, a select one or more of the push switches 122(1) to 122(6) are actuated (e.g., caused to open or close) by a base portion of a toy figure when the toy FIG. 30 is inserted in the activation receptacle.

Similarly, the switch network 130 comprises push switches 132(1) and 132(2) connected to the controller 110. Each push switch 132(1) and 132(2) is associated with a corresponding one of the dock switch levers 56 in the activation receptacle 50. Each push switch 132(1) and 132(2) is normally open but can be pushed closed when actuated by a corresponding one of the dock switch levers 56 when any of the toy FIG. 30 are inserted properly into the activation receptacle 50.

The controller 110 detects when the dock switches 132(1) and 132(2) are both closed, indicating that a toy figure has been properly inserted into the activation receptacle 50. Upon determining that a toy figure is properly inserted into the activation receptacle 50, the controller determines the state of the switches 122(1) to 122(6) in order to identify which of the plurality of toy FIG. 30 is inserted in the activation receptacle. The controller generates an output reflecting the state of the switches 122(1) to 122(6) (as well as the state of switches 132(1) and 132(2)) that is transmitted on the connection cable 40 for supply to a software process running on a PC (not shown) to which the connection plug 42 is connected.

The navigation switch network 140 comprises four switches 142(1), 142(2), 142(3 and 142(4) each of which is connected to the controller 110. The solitary keypad switch 150 is also connected to the controller 110 and is used as an "enter" or "ok" function key for certain applications of the device 10. The controller 110 detects closure of any one of the switches in the switch network 140 and the solitary keypad switch 150 and generates an appropriate keypad output signal that is supplied in a message over the connection cable 40 to a software process running on the connected PC (not shown). As described hereinafter, the software in the computer in response sends a corresponding command to a web site based on which of the navigation buttons (or solitary button) is depressed.

Figure 10:
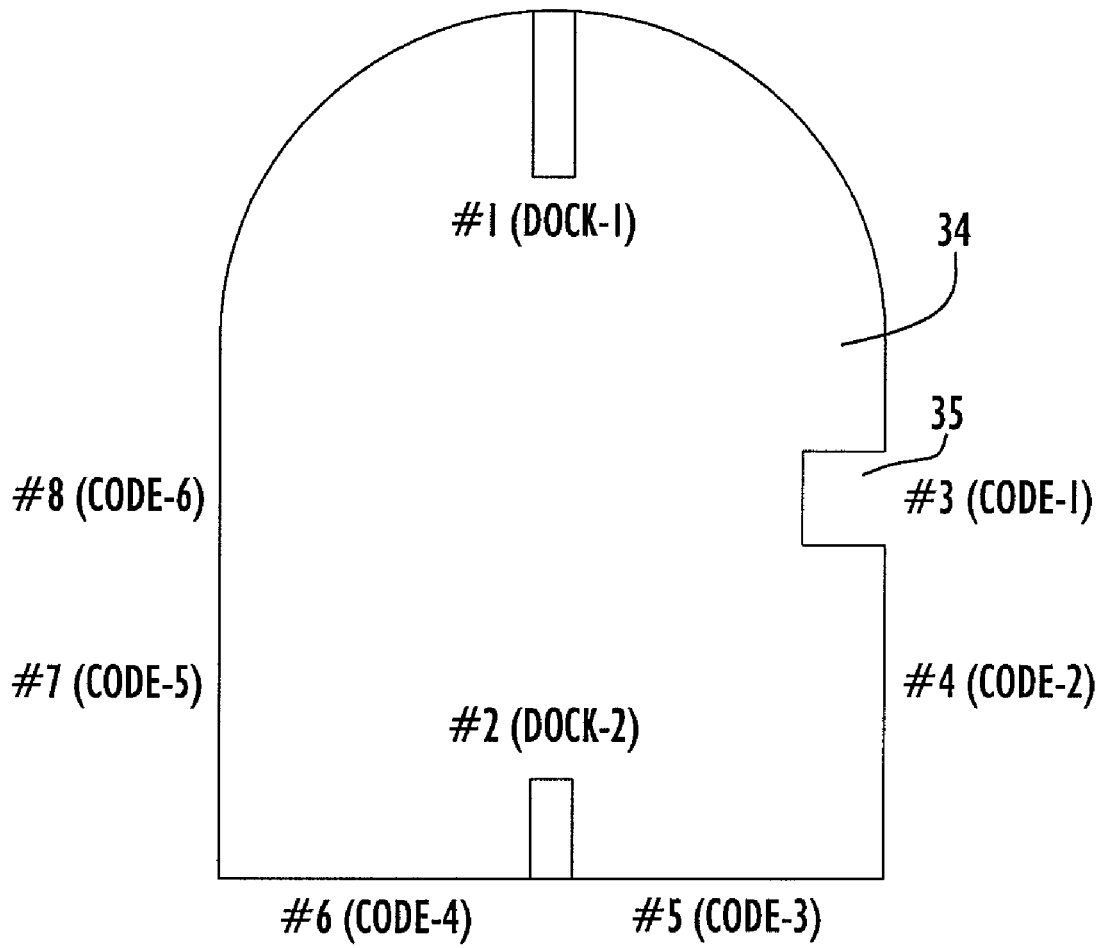
FIG. 10 is a schematic view of a base portion of a toy figure and illustrating the structure characteristics of the base portion that are detected by the identifying portion of the computer peripheral toy device according to an embodiment of the present invention.

Turning to FIG. 10 with continued reference to FIG. 9, a coding scheme is described that is used to assign states of the switches in the switch network 120 to corresponding toy FIGS. 30(1) to 30(N). FIG. 10 shows the profile of the base toy FIG. 30(1) as an example. A code or name CODE-1 to CODE-6 is assigned to corresponding ones of the switches 122(1) to 122(6), which in turn correspond to locations of a notch 35 on the base 34 of a toy figure. One or more of the switches 122(1) to 122(6) are caused to be left in an open position when there is a notch on the base of the toy figure at the corresponding one or more notch locations as shown in FIG. 10. Thus, a unique combination of switch states is assigned to each of the toy FIG. 30, and the base 34 with a notch at the corresponding one or more notch positions is used for that toy figure. Table 1 set forth below lists examples of switch names and the switch states for several exemplary toy figures, including the toy FIGS. 30(1), 30(2) and 30(3) described herein. A bit value ("0" or "1") can be assigned to each switch state as set forth in the table below, and a bit pattern can be generated that describes the state of the switches 122(1) to 122(6) and 132(1) to 132(2) as shown in Table 1. For example, when toy FIG. 30(1) is inserted into the activation receptacle, only switch 122(1) is opened as a result of the notch on the base of toy FIG. 30(1) at the location corresponding to the switch lever 54 for switch 122(1). Thus, Bit 2 would be set to "1" and the remaining bits in Bits 0 to Bit 7 are set to "0". When toy FIG. 30(2) is inserted into the activation receptacle, switches 122(1) and 122(2) are opened as a result on the notch on the base of toy FIG. 30(2) at the location corresponding to the switch levers 54 for switches 122(1) and 122(2). Thus, Bit 2 and Bit 3 would be set to "1" and the remaining bits in Bits 0 to Bit 7 are set to "0".

TABLE 1

| FIG. | Switch | | | | | | | | Bit Pattern |
|---|---|---|---|---|---|---|---|---|---|
| | 122(6) | 122(5) | 122(4) | 122(3) | 122(2) | 122(1) | 132(2) | 132(1) | |
| | Switch Name | | | | | | | | |
| | CODE-6 | CODE-5 | CODE-4 | CODE-3 | CODE-2 | CODE-1 | DOCK-2 | DOCK-1 | |
| | Bit | | | | | | | | |
| | 7 | 6 | 4 | 4 | 3 | 2 | 1 | 0 | |
| 30(1) | Closed (bit = 0) | Closed (bit = 0) | Closed (bit = 0) | Closed (bit = 0) | Closed (bit = 0) | Open (bit = 1) | Closed (bit = 0) | Closed (bit = 0) | 00000100 |
| 30(3) | Closed (bit = 0) | Closed (bit = 0) | Closed (bit = 0) | Closed (bit = 0) | Open (bit = 1) | Closed (bit = 0) | Closed (bit = 0) | Closed (bit = 0) | 00001000 |
| 30(2) | Closed (bit = 0) | Closed (bit = 0) | Closed (bit = 0) | Closed (bit = 0) | Open (bit = 1) | Open (bit = 1) | Closed (bit = 0) | Closed (bit = 0) | 00001100 |

Figure 11:
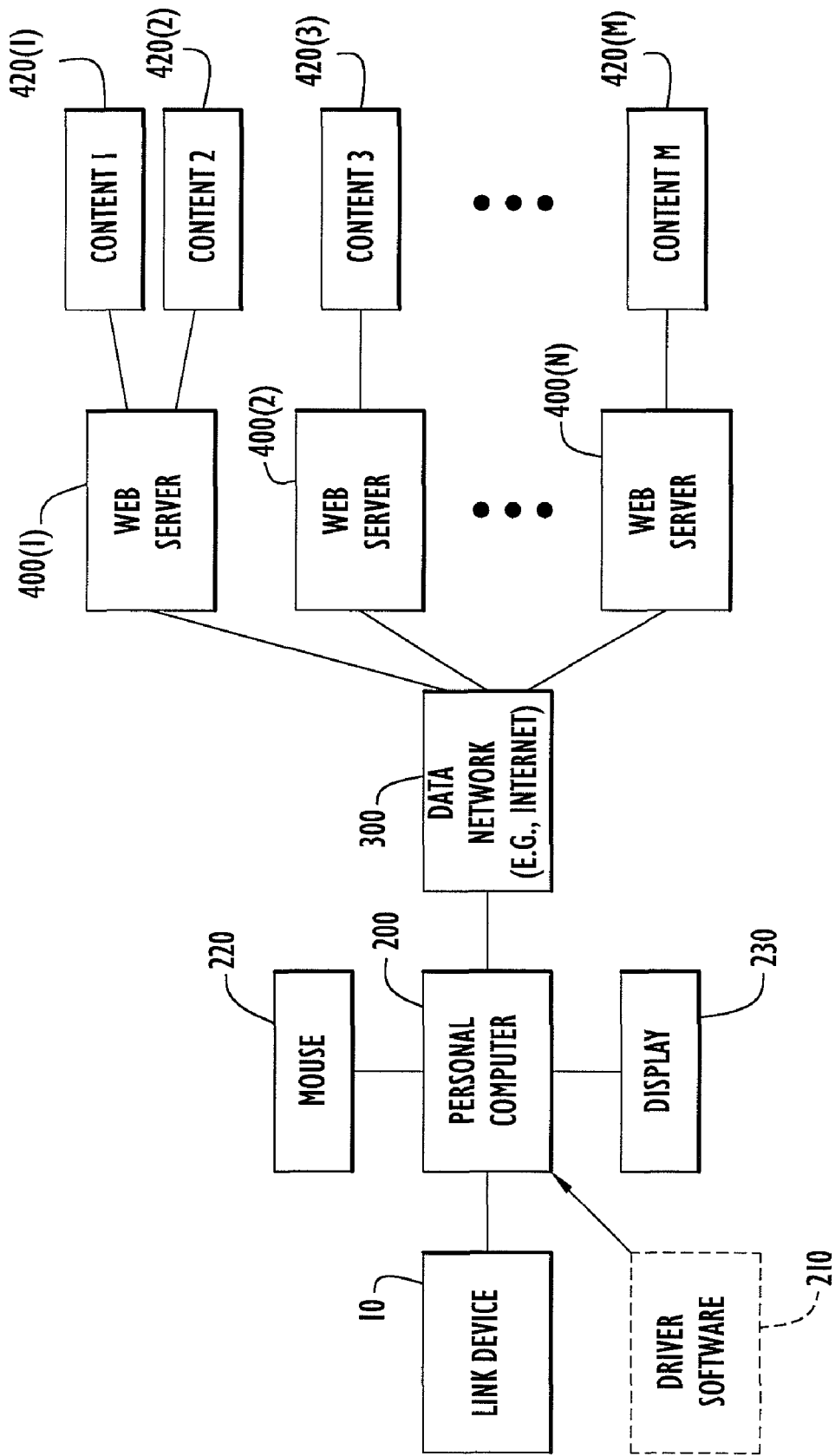
FIG. 11 is a block diagram depicting an operational environment of the computer peripheral toy device in connection with a computer according to an embodiment of the present invention.

Reference is now made to FIG. 11 for a description of operation of the device 10. The device 10 is connected to a PC 200 via the connection cable 40. Driver software 210 is installed in the PC 200 to control how the PC 200 interacts with the device 10. Also connected to the PC 200 are a mouse 220 and a display monitor 230. The PC 200 also connects to a data network 300 (e.g., the Internet) via a network interface (not shown) in order to access content managed by one or more of a plurality of web servers 400(1) to 400(N). The web servers 400(1) to 400(N) serve a plurality of content (graphic, audio, games, videos, etc.) shown at reference numerals 420(1) to 420(M). For example, content 1 and content 2 at reference numerals 420(1) and 420(2) are served by web server 400(1) and content 3 at 420(3) is served by web server 400(2).

Operation of the device 10 is now described with reference to the flowcharts of FIGS. 12 and 13, and the block diagram of FIG. 14. The device 10 allows a child to access several web sites whose content is appropriate for children and having a theme or subject matter that is related to the appearance of the toy figure selected by the user and inserted into the activation receptacle. FIG. 14 illustrates the flow of data during installation and use of the device 10 with a PC 200. Reference numerals are shown in FIG. 14 for operations that correspond to functions in the flowcharts of FIGS. 12 and 13.

Figure 12:
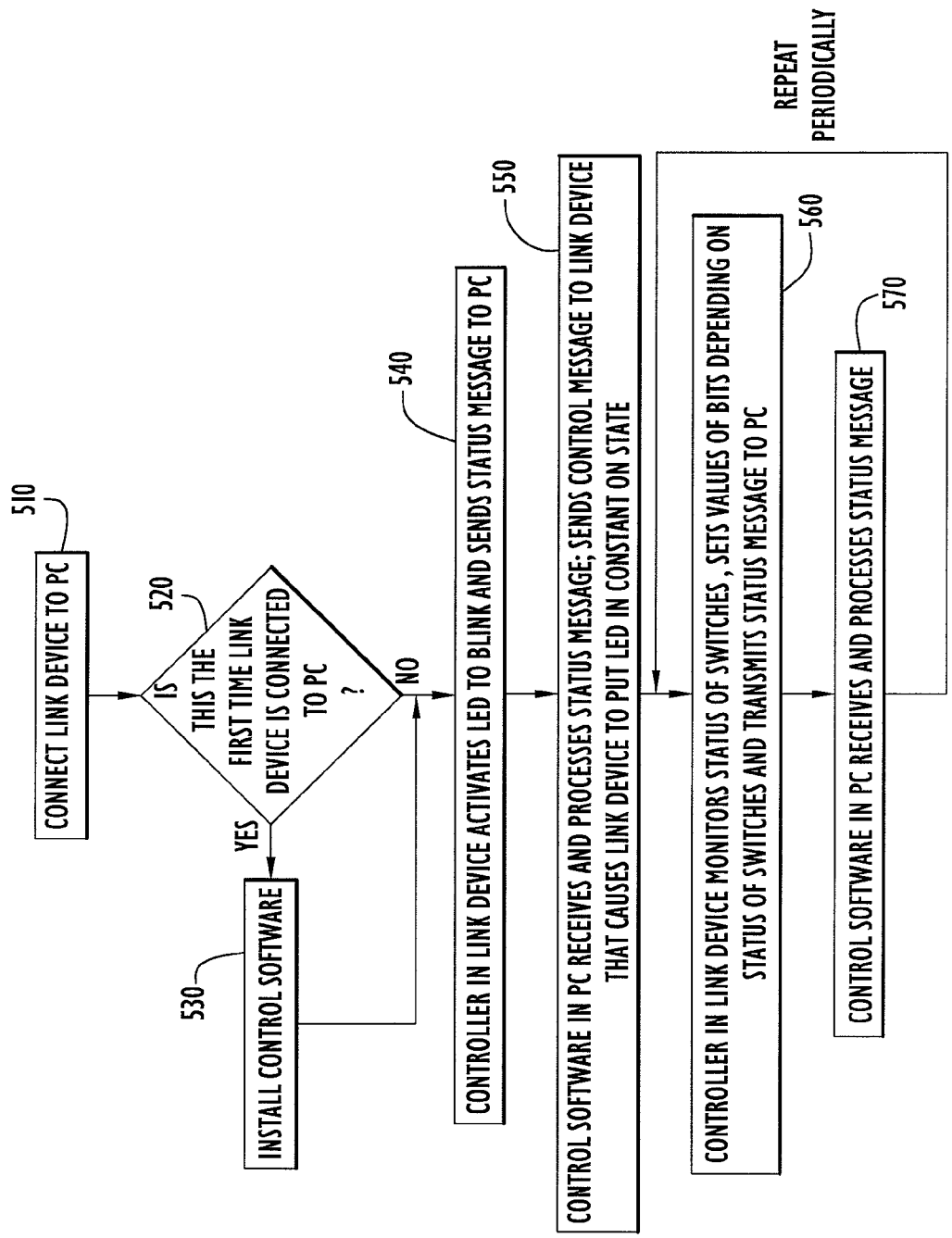
FIG. 12 is a flow chart generally depicting operation of the computer peripheral toy device and driver software stored in a computer that is connected to the computer peripheral toy device according to an embodiment of the present invention.

Referring to FIG. 12, at 510, the device 10 is connected to a PC 200 using the connection cable 40. For example, the connection cable 40 is a USB cable and it is inserted into a USB port of the PC 200. If the operating system on the PC 200 determines at 520 that this is the first time the device has been connected to the PC 200, then at 530, the driver software 210 is installed on the PC 200 either from a memory medium (e.g., CD-ROM) distributed with the device, or by downloading the appropriate software from an update server 430 via the Internet. When the driver software 210 is installed in the PC 200, included with the driver software 210 is data for a look-up table 216 mapping universal resource locators (URLs), also known as IP or web addresses, to each of the bit patterns ("Smart Key Codes") associated with a corresponding one of the toy FIG. 30. The driver software 210 also includes a link notifier function 212 and a web browser application 214 as shown in FIG. 14. Table 2 below provides examples of the URLs that are included in the look-up table 216 stored in the PC 200.

TABLE 2

| FIG. | Bit Pattern | URL |
|---|---|---|
| 30(1) | 00000100 | WWW.XXCCTT.COM |
| 30(3) | 00001000 | WWW.XXYYZZ.COM |
| 30(2) | 00001100 | WWW.XXYXTRT.COM |
| ... | | |

The web site address is associated with an identifier for a toy figure, and is for a web site that provides content which is topically related to the physical appearance or likeness of the corresponding toy figure. This is further explained hereinafter in conjunction with FIG. 15.

It should be understood that the driver software may be updated from time to time from the update server 430 that maintains updated installation driver software 432 as well as updated Smart Key Code-Web Site look-up table data 434. For example, new toy figures may be sold or made available to users after initial purchase of the device. The driver software supplied with the device and installed the first time it is used would not necessarily have the web site address information for these new toy figures. Thus, the driver software may be updated to add web site address information for the new toy figures.

If it is not the first time the device is connected to the PC 200, then the process continues at 540 where the controller in the device 10 activates the LED D1 to blink and sends a status message to the PC 200. The status message sent at 540 includes an indication to the driver software that the LED D1 is in blinking mode. Examples of a status message are described hereinafter.

At 550, the driver software in the PC 200 receives and processes the status message received from the device 10. Specifically, in response to receiving a status message indicating that the LED D1 is blinking, the driver software in the PC 200 knows that the device is connected to the PC, but that no toy figure has yet been inserted into the activation receptacle. As a result, the driver software generates and transmits a control message to the device 10 that causes the controller 110 in the device 10 put the LED D1 into a constant or steady ON mode.

At 560, the controller 110 in the device 10 periodically monitors the status of the switches associated with the switch levers in the activation receptacle as well as the navigation switches and solitary switch, and generates a status message. In one embodiment, the status message that the controller 110 generates a status message that comprises multiple bytes of data, where each byte comprises 8 bits, for example. A first byte of the status message comprises Bit 0 to Bit 7 described above in conjunction with Table 1. This first byte contains the "Smart Key Code" and is defined as follows.

| Byte 1 | Description | State |
| --- | --- | --- |
| Bit 0: | Code Switch, DOCK1 | 0 = ON, 1 = OFF |
| Bit 1: | Code Switch, DOCK2 | 0 = ON, 1 = OFF |
| Bit 2: | Code Switch, CODE-1 | 0 = ON, 1 = OFF |
| Bit 3: | Code Switch, CODE-2 | 0 = ON, 1 = OFF |
| Bit 4: | Code Switch, CODE-3 | 0 = ON, 1 = OFF |
| Bit 5: | Code Switch, CODE-4 | 0 = ON, 1 = OFF |
| Bit 6: | Code Switch, CODE-5 | 0 = ON, 1 = OFF |
| Bit 7: | Code Switch, CODE-6 | 0 = ON, 1 = OFF |

Another byte of the status message generated by the controller 110 includes data indicating the status of the LED, the navigation switches and the solitary switch. An example of this byte of the status message is as follows.

| Byte 2 | Description | State |
| --- | --- | --- |
| Bit 0: | LED Status | 0 = STEADY (ON or OFF depending on Bit 7), 1 = LED is BLINKING |
| Bit 1: | ignored | |
| Bit 2: | Enter/OK Switch | 0 = ON, 1 = OFF |
| Bit 3: | DOWN Switch | 0 = ON, 1 = OFF |
| Bit 4: | UP Switch | 0 = ON, 1 = OFF |
| Bit 5: | RIGHT Switch | 0 = ON, 1 = OFF |
| Bit 6: | LEFT Switch | 0 = ON, 1 = OFF |
| Bit 7: | LED Status | 0 = LED is ON, 1 = LED is OFF |

The controller 110 periodically monitors the status of the various switches and the LED and generates status messages for transmission to the PC 200. As shown in FIG. 14, when a toy figure is inserted into the device 10, the device 10 sends to the PC 200 a status message containing the Smart Key Code corresponding to that toy figure. At 570, the driver software in the PC 200 receives and processes the status message received from the device.

Figure 13:
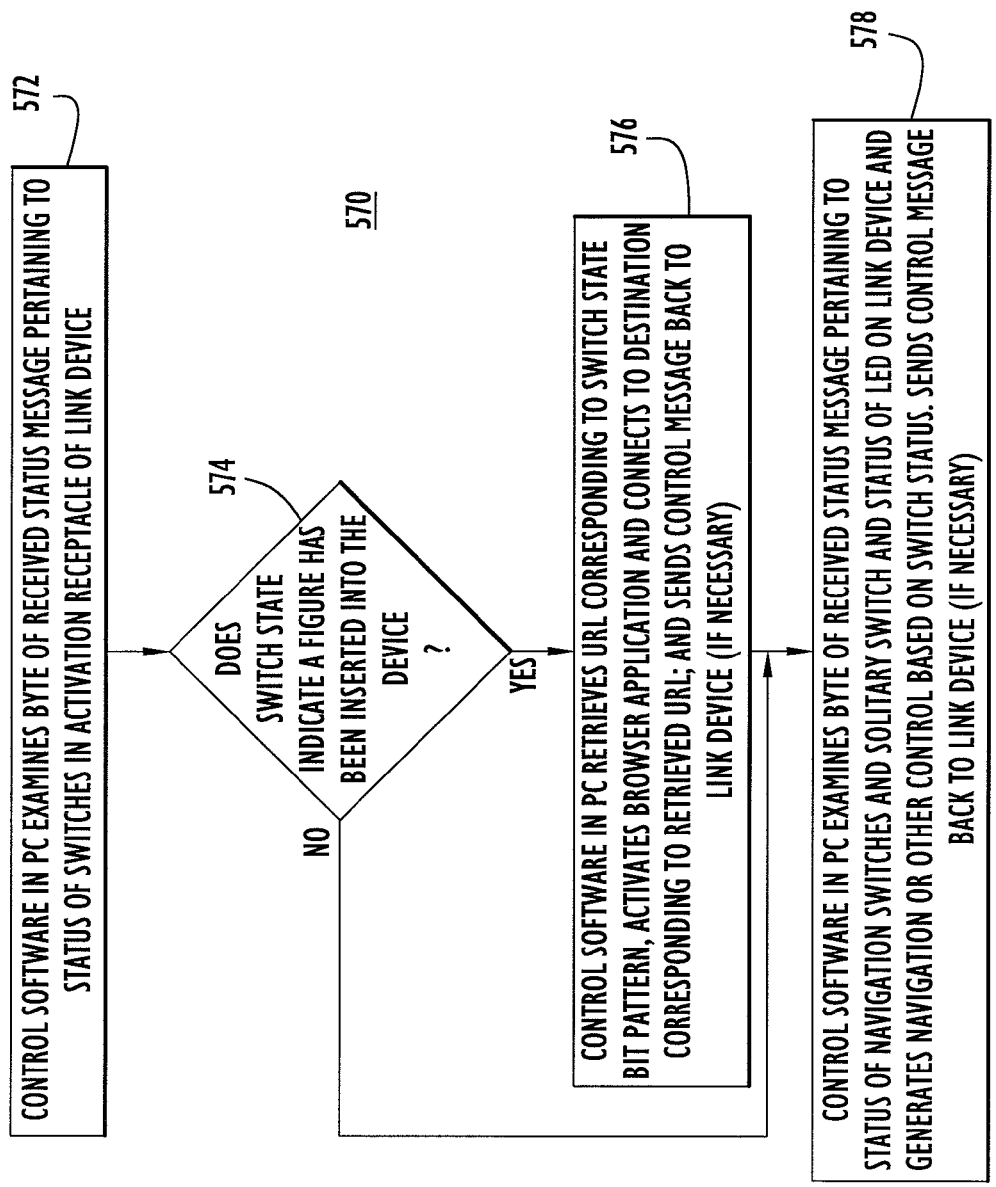
FIG. 13 is a more detailed flow diagram depicting operation of the driver software in the computer that connects to the computer peripheral toy device according to an embodiment of the present invention.
Figure 14:
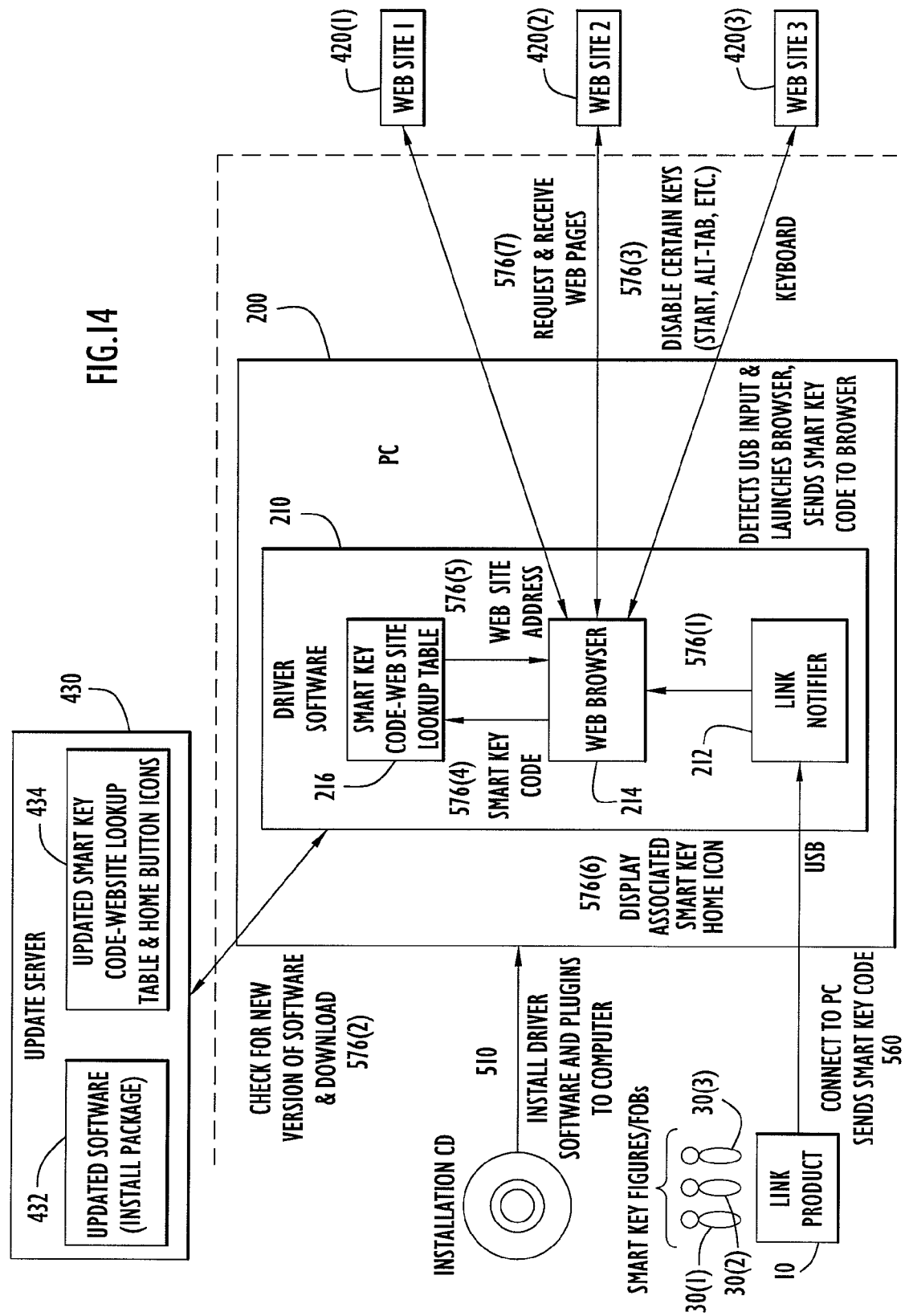
FIG. 14 is a flow diagram depicting operation of the computer peripheral toy device and driver software according to an embodiment of the present invention.

With reference to FIG. 13, the processing of status messages by the driver software in the PC 200 is described in more detail. At 572, the driver software in the PC examines the byte (Byte 1) of the status message that pertains to the status of the switches in the activation receptacle of the device 10. At 574, the driver software in the PC 200 compares the values of Byte 1 for the current status message with the stored values of Byte 1 from the previous status message to determine whether a toy figure has been inserted into the activation receptacle. This may involve the bits of Byte 1 changing from a nominal state (at the previous status message) in which no toy figure was previously in the activation receptacle to a state in which one of the toy figures has been inserted into the activation receptacle. Alternatively, this may involve the bits of Byte 1 changing from a state at the previous status message at which a first toy figure had been inserted into the activation receptacle to a state in which a second, different, toy figure has been inserted into the activation receptacle. In either case, if is determined at 574 that a toy figure has been inserted (for the first time, or a different toy figure) into the activation receptacle, then at 576, the link notifier function 212 of the driver software 210 in the PC 200 sends a command to the launch the web browser 214 and sends the Smart Key Code to the web browser 214. This is shown at 576(1) in FIG. 14. It is noted here that the web browser 214 is separate from any web browser application that may already be installed on the PC 200. The web browser 214 is dedicated solely for use with the device 10 and cannot be activated, deactivated or controlled using standard keyboard or mouse input.

Before the web browser 214 sends an outgoing to request content from the web site corresponding to the received Smart Key Code, connection to the update server 430 may be made to check for a new version of the driver software 210 and any updates to the web site addresses. This is shown at 576(2) in FIG. 14. In addition, if a user purchases a new toy figure after initial installation of the driver software, the driver software will recognize that the identifier received from the controller of the device 10 is not contained in the stored data in the look up table 216 and thus will download and store in the look up table 216 the appropriate web site address for that toy figure from the update server 430.

Next, the web browser 214 sends a command to PC 200 to disable the PC 200 from responding to certain key interrupts from a keyboard 240 attached to the PC 200 shown in FIG. 14 at 576(3). Thus, when the web browser application is activated the PC 200 ignores interrupts from certain keys on the keyboard 240 associated with the PC 200.

Then, the web browser 214 sends the Smart Key Code received from the link notifier 212 to the look up table 216 at 576(4) and receives the corresponding web site address (e.g., URL) from the look-up table 216 at 576(5).

At 576(6) shown in FIG. 14, the driver software 210 may send a command to the PC 200 to cause display of an icon (on the computer display 230) that is associated with the Smart Key Code received. Then, at 576(7) in FIG. 14, the web browser 214 sends a request for content from a web site associated with the retrieved web site address and receives the web content for presentation to a user on the display 230 and/or associated audio speakers.

The driver software in the PC 200 may transmit a control message back to the device 10 with a command to put the LED in the device in a steady ON state.

In addition, at 578, the driver software in the PC 200 examines the byte (Byte 2) of the received status message that pertains to the status of the navigation switches and solitary switch as well as the LED on the device. Depending on which, if any, of the navigation switches or solitary switch is closed, the driver software will generate a message containing a control that is supplied to the browser application for transmission to the web site.

When the driver software generates a control message for transmission to the device 10, the control message comprises a first bit that commands the controller in the device to turn the LED ON or OFF ("1"=OFF, "0"=ON), and a second bit that signifies whether the controller in the device has control of the LED or the driver software in the PC has control of the LED ("0"=controller in device has control of the LED, "1"=driver software in the PC has control of the LED). When the driver software in the PC wishes to turn the LED ON or OFF, it will set the second bit to "1" in order to take control of LED. In the same control message byte, the driver software will set the first bit to the appropriate value to turn the LED ON or OFF. In all future transmissions, the driver software sets the second bit to "0" in order to relinquish control of the LED to the controller in the device. In this way, the controller in the device 10 is free to blink the LED when a new toy figure is inserted). When the browser application is terminated, the driver software 210 will send a control message to the controller in the device with the appropriate bit settings to command the controller to turn OFF the LED.

Reference is now made to FIG. 15 that shows an example of operation of the device 10 according to an embodiment of the present invention. In FIG. 15, the toy FIG. 30(2) is inserted into the activation receptacle of the device 10 which causes the PC to which the device 10 is connected (as shown in FIG. 11) to activate a browser application and retrieve content from a web site associated with a web site address that is assigned to the toy FIG. 30(2). The display screen 600 shown in FIG. 15 corresponds to the content delivered to the PC's display monitor when the toy FIG. 30(2) is inserted into the device 10. The icon shown at reference numeral 610 at the top left of the screen 600 corresponds to the character of the toy FIG. 30(2), and therefore the child-friendly content provided in the displayed web page is topically or thematically related to the physical appearance or likeness of the toy FIG. 30(2). The icons 620 shown in the middle of the screen 600 are links to various activities that a child user can play using the device 10 and a mouse. Clicking the icon 610 will return the PC to the home web page shown in FIG. 14.

In addition, as shown in FIG. 15, the user interface of the driver software 210 is contained in a "closed" desktop skin such that the web browser application does not allow a user to type in the URL of a web site, display banner advertisements that a child user could click on, and does not display links to other (unsafe) web sites that a child user could select.

Selecting the parent control icon 630 shown in FIG. 15 causes the driver software in the PC to display the parental control screen 700 shown in FIG. 16. The parental control screen 700 comprises user interface controls for parameters that a parent can set to control usage of the device 10 by a child user. For example, as shown at 710, there is a password section that requires entry of a parent-designated password for the ability to change settings in the parental control screen 700 and for deactivating the driver software 210. There is a time limit control section 720 that allows a parent to set a specified time limit for use of the device 10 by a child. When activated, the driver software 210 will close the browser application and prevent a child from initiating a connection session after the time limit has expired. There is also a print permission section 730 where a parent can designate whether a child user is permitted to print content from a web site.

Turning now to FIG. 17, a quit screen 800 is shown. The quit screen 800 is displayed by the driver software 210 when a child user selects the "x" icon 640 shown in FIG. 14 to quit the driver software application. The quit screen 800 requires that a parent with knowledge of the password (established on the parent control screen 600 shown in FIG. 15) enter the appropriate password in order to disable the browser application on the PC (close the driver software application) and thereby enable access to other software applications and functions on the PC. The quit screen 800 is provided to prevent a child user from gaining access to any applications on the PC other than the driver software for the device 10. Thus, the user interface of the driver software 210 is contained in a "closed" desktop skin that uses a browser application that does not allow a user to access any web site content other than content from web sites that are in the programmed URLs in the device 10. Furthermore, when a user quits the driver software application, the application cannot be completely shut down on the computer until the correct password is entered, thus preventing a child user (who does not know the password) from closing the driver software application and accessing other PC functions such as a generic browser application on the PC.

The systems and methods described herein may be embodied in other specific forms without departing from the spirit or essential characteristics thereof. The foregoing embodiments are therefore to be considered in all respects illustrative and not meant to be limiting.

What is claimed is:

1. A system for accessing web site content, the system comprising:
   a computer peripheral device including:
   a. a housing;
   b. a connection cable that connects the housing unit to a computer;
   c. a plurality of figures, each figure having a base with unique structure characteristics;
   d. a receptacle on the housing that is configured to receive the base of one of the plurality of figures;
   e. a plurality of switches, a unique combination of which are actuated by the base of a figure inserted in the receptacle; and
   f. a controller in the housing that is electrically connected to the connection cable and to the plurality of switches, wherein the controller identifies which one of the plurality of figures is inserted in the receptacle of the housing based on states of the plurality of switches; and
   a computer connected to the computer peripheral device by the connection cable, wherein the computer communicates with said controller and stores a web site address associated with an identifier for each of the plurality of figures, said controller generates the identifier for the figure inserted in the receptacle of the housing and sends the identifier to the computer, and wherein the computer activates a web browser application on the computer to access content from a web site using a web site address corresponding to an identifier received from said controller in the computer peripheral device.

2. The system of claim 1, wherein each of the plurality of figures has a unique shape, color pattern or indicia thereon, and wherein the web site address associated with each figure is for a web site containing content that is related to the shape, color pattern or indicia of the corresponding figure.

3. The system of claim 1, wherein the plurality of figures are toy figures each of which having a unique physical appearance, and wherein the web site address associated with each toy figure is for a web site containing content that is thematically related to a physical appearance of the corresponding toy figure.

4. The system of claim 1, and further comprising a plurality of buttons disposed on a surface of the housing and connected to said controller, wherein said controller is responsive to actuation of one of the plurality of buttons and sends a message to said computer that in response sends a command to a web site with which the computer is communicating.

5. The system of claim 1, and further comprising a plurality of switch levers positioned on an inner side wall of the receptacle and each being operatively connected to a corresponding one of the switches, and wherein the base of each of the plurality of figures comprises a different external surface profile that engages a unique combination of the switch levers when inserted into the receptacle.

6. A system for accessing web site content, the system comprising:
   a computer peripheral device including:
   a. a housing;
   b. a plurality of figures each having a unique physical appearance;
   c. an identifying portion on the housing that receives one of the plurality of figures and identifies which of the plurality figures is placed in identifying portion based on a structural characteristic of the figure;

d. a connection cable that electrically connects to a computer; and e. a controller coupled to said identifying portion, wherein the controller generates a signal containing an identifier of which one of the plurality of figures is placed in the identifying portion for transmission to a computer via said connection cable; and a computer connected to the computer peripheral device by the connection cable, wherein the computer comprises software that enables communication between said controller in the computer peripheral device and the computer, and wherein the software stores data associating a web site address with an identifier for each of the plurality of figures.

7. The system of claim 6, wherein each of the figures comprises a base having a unique structural characteristic and wherein the identifying portion receives the base of a figure.

8. The system of claim 6, wherein the identifying portion comprises a plurality of push switches that are selectively depressed by the base of a figure placed into the identifying portion, and wherein the controller identifies which figure is placed therein based on which of the plurality of push switches are depressed.

9. The system of claim 6, wherein the computer comprises software for a web browser application that is activated to access and retrieve content from a web site using a web site address corresponding to an identifier received from the controller in the computer peripheral device.

10. The system of claim 9, wherein when the web browser application is activated the computer ignores interrupts from certain keys on a keyboard associated with the computer.

11. The system of claim 6, wherein each web site address stored in the computer is associated with a web site that supplies content which is thematically related to the physical appearance of the corresponding figure.

12. The system of claim 6, wherein the computer connects to a server to update the stored data that associates a web site address with an identifier for each of the plurality of figures.

13. The system of claim 12, wherein the computer connects to the server in response to determining that the identifier received from the controller in the computer peripheral device is not contained in the stored data.

14. The system of claim 6, wherein the plurality of figures are toy figures each of which has a unique physical appearance, and wherein the web site address associated with each toy figure is for a web site containing content that is thematically related to a physical appearance of the corresponding toy figure.

15. The system of claim 6, wherein the housing comprises at least one location to support a figure when it is not placed in said identifying portion.

16. A method for accessing web site content, comprising:

a. providing a plurality of figures having a unique physical appearance and structure;

b. inserting one of the plurality of figures into a portion of a housing unit;

c. structurally identifying which of the plurality of figures is inserted into the portion of the housing unit;

d. generating an electrical signal containing information that identifies which of the plurality of figures is inserted into the portion of the housing unit;

e. coupling the electrical signal to a computer that has internet access;

f. storing in the computer data associating a web site address with an identifier for each of the plurality of figures; and g. receiving at the computer the electrical signal from the housing unit and accessing web site content from a web site address corresponding toy figure that is identified by the information in the electrical signal.

17. The method of claim 16, wherein said providing comprises providing a plurality of toy figures, and wherein said storing comprises storing data for a web site address containing content that is thematically related to the physical appearance of the corresponding toy figure.

18. A system for accessing web site content, the system comprising:

a computer peripheral device comprising:

a. a housing, b. a plurality of figures each having a unique physical appearance, c. an identifying portion on the housing that receives one of the plurality of figures and identifies which of the plurality figures is placed in identifying portion based on a structural characteristic of the figure, d. a connection cable that electrically connects to a computer, and e. a controller coupled to said identifying portion, wherein the controller generates a signal containing an identifier of which one of the plurality of figures is placed in the identifying portion for transmission to a computer via said connection cable; and a computer connected to the device by the connection cable, wherein the computer communicates with said controller, the combination storing a website address associated with the identifier for each of the plurality of figures, said controller sending the signal containing an identifier for a figure placed in the identifying portion of the housing to the computer, and wherein the computer activates a web browser application on the computer to access content from a web site using a web site address corresponding to the signal containing an identifier received from said controller in the computer peripheral device.

* * * * *

UNITED STATES PATENT AND TRADEMARK OFFICE
CERTIFICATE OF CORRECTION

PATENT NO. : 7,886,020 B2
APPLICATION NO. : 11/872109
DATED : February 8, 2011
INVENTOR(S) : Sullivan et al.

It is certified that error appears in the above-identified patent and that said Letters Patent is hereby corrected as shown below:

Column 3, line 19, change "FIGS." to --figures--;
Column 3, line 25, change "FIG." to --figures--;
Column 3, line 27, change "FIG." to --figure--;
Column 3, line 34, change "FIG." to --figure--;
Column 3, line 38, change "FIG." to --figure--;
Column 3, line 66, change "FIG." to --figure--;
Column 4, line 5, change "FIG." to --figure--;
Column 4, line 7, change "FIG." to --figure--;
Column 4, line 16, change "FIG." to --figure--;
Column 4, line 23, change "FIG." to --figure--;
Column 4, line 29, change "FIG." to --figure--;
Column 4, line 35, change "FIG." to --figure--;
Column 4, lines 54-59 (each occurrence) change "FIG." to --figure--;
Column 5, line 5, change "FIG." to --figure--;
Column 5, line 7, change "FIG." to --figure--;
Column 5, line 10, change "FIG." to --figure--;
Column 5, line 14, change "FIG." to --figure--;
Column 5, line 17, change "FIG." to --figure--;
Column 5, line 18, change "FIGS." to --figures--;
Column 5, line 21, change "FIGS." to --figures--;
Column 5, line 24, change "FIG." to --figure--;
Column 5, line 25, change "FIG." to --figure--;
Column 5, line 55, change "FIG." to --figure--;
Column 6, line 1, change "FIG." to --figure--;
Column 6, line 9, change "FIG." to --figure--;
Column 6, line 32, change "FIGS." to --figures--;
Column 6, line 33, change "FIG." to --figure--;
Column 6, line 41, change "FIG." to --figure--;
Column 6, line 45, change "FIG." to --figure--;

Signed and Sealed this
Fourth Day of October, 2011

David J. Kappos
*Director of the United States Patent and Trademark Office*

CERTIFICATE OF CORRECTION (continued)
U.S. Pat. No. 7,886,020 B2

Column 6, line 50, change "FIGS." to --figures--;
Column 6, line 52, change "FIG." to --figure--;
Column 6, line 55, change "FIG." to --figure--;
Column 6, line 57, change "FIG." to --figure--;
Column 7, line 58, change "FIG." to --figure--;
Column 11, line 3, change "FIG." to --figure--;
Column 11, line 8, change "FIG." to --figure--;
Column 11, line 10, change "FIG." to --figure--;
Column 11, line 13, change "FIG." to --figure--;
Column 11, line 15, change "FIG." to --figure--.